United States Patent [19]
Mathauser

[11] 3,776,333
[45] Dec. 4, 1973

[54] BICYCLE BRAKE ARRANGEMENT
[76] Inventor: William R. Mathauser, P.O. Box 5, Sun Valley, Idaho 83353
[22] Filed: Apr. 13, 1972
[21] Appl. No.: 243,587

Related U.S. Application Data
[63] Continuation-in-part of Ser. No. 179,016, Sept. 9, 1971.

[52] U.S. Cl. .................................. 188/344, 188/24
[51] Int. Cl. .......................................... B60z 11/24
[58] Field of Search ..................... 188/24, 26, 344, 188/345

[56] References Cited
UNITED STATES PATENTS
3,554,334  1/1971  Shimano ........................... 188/344
FOREIGN PATENTS OR APPLICATIONS
518,408  11/1955  Canada ............................ 188/344

Primary Examiner—Duane A. Reger
Attorney—Luke A. Mattare et al.

[57] ABSTRACT

A bicycle brake arrangement in which each of the front and rear wheel forks adjustably carry a pair of hydraulic slave cylinder-piston units, one unit of each pair being on an opposite side of a wheel rim with each unit having brake shoe means associated therewith for movement toward and away from a wheel rim, there being an independent fluid transmission line from each of two hydraulic master cylinder-piston units to the respective pairs of front and rear wheel associated slave cylinder-piston units and a hand operated control means for pressurizing both master cylinder-piston units to actuate the brakes.

26 Claims, 15 Drawing Figures

PATENTED DEC 4 1973

BICYCLE BRAKE ARRANGEMENT

BACKGROUND OF THE INVENTION

This application is a continuation-in-part of application Ser. No. 179,016, filed Sept. 9, 1971, entitled BICYCLE BRAKE ARRANGEMENT.

The present invention relates to a bicycle brake arrangement.

More particularly, the invention relates to a hydraulically actuated braking arrangement in which brake blocks or shoes are operably associated with both the front and rear wheels of the bicycle and are respectively actuated to wheel braking conditions by individual hydraulic actuators.

Hydraulically actuated braking systems are known in the art but usually the respective front and rear brake shoes or blocks are each associated with a hand operated lever for actuating the same so that the operator has to use one hand to apply the front brake and the other hand to apply the rear brake.

Other systems are known in which a single hand operated lever produces pressure in a closed hydraulic system which applies the brakes to both the front and rear wheels, via a single flow line.

In the former instance, the actuation is too clumsy, while in the latter instance a leakage or malfunction in the fluid line would void all braking aspects.

Additionally, in known systems, the brake shoes or blocks are usually lever arm supported and add considerably to the weight of a racing type bicycle and can be obstacles in the event a wheel change is needed.

Consequently, it is desirable to provide a bicycle brake arrangement which embodies a brake shoe or block assembly associated with each of the front and rear wheels, a separate hydraulic system for actuating the respective shoes or blocks to brake applying condition and only a single hand manipulated operator to control both systems.

Likewise, it is desirable to provide a braking arrangement for bicycles in which the brake shoes or blocks are so mounted and arranged relative to the wheel rims that they can readily be moved out of the way whenever it is necessary to change a wheel.

Further, it is desirable to provide a hydraulically actuated braking arrangement in which each of a pair of brake shoes or blocks associated with each wheel rim is capable of individual adjustment as to its position relative to the rim.

STATEMENT OF THE INVENTION

Accordingly, the invention provides a hydraulically actuated braking arrangement for a bicycle in which brake shoes or blocks are arranged in pairs with each pair being operably related relative to a wheel rim. A hydraulic system is provided for moving the pairs of brake shoes or blocks to brake applying condition that includes a master cylinder for each pair of shoes or blocks, the master cylinders are mounted close together in one of the bicycle handlebars and only one hand manipulatable control member is provided to actuate both master cylinders.

Further, the invention provides an arrangement in which each brake shoe or block can be individually adjusted relative to the associated wheel rim so that the front and rear brakes can be applied simultaneously or at a different timing.

Specifically, in the invention each brake shoe or block is carried by the movable components of a hydraulic cylinder-piston unit, that is arranged to impart a reciprocating movement to the associated brake shoe or block and in which the position of the stationary component of such unit can be axially adjusted relative to an adjacent wheel rim.

Another feature of the invention consists in so mounting the brake shoes or blocks that a pivotal or swinging movement can be applied thereto so that they can be adjusted to accommodate different design wheel rims.

A further feature of the invention consists in mounting the brake shoe or block and the piston-cylinder units in a quick release clamp mounting so that the brake shoes or blocks can be moved away from the bicycle wheel to facilitate a wheel change.

Still another feature of the invention consists in providing the mountings for the hand manipulatable control member and the brake shoe or block supports as clamp on components so that with a closed and sealed hydraulic system and with the adjustability features of the invention, the braking system can be sold as a separate unit or attachment for replacing any existing cable operated braking system utilizing caliper type brakes. Alternatively, the braking system of the present invention can be assembled on a bicycle at the time of manufacture of the bicycle as an integral part thereof.

Yet another feature of the invention resides in the provision of cooling fins in association with a brake shoe accommodating tray and the cylinder-piston units associated with the wheel rims.

BRIEF DESCRIPTION OF THE DRAWINGS

Further and more specific objects and advantages of the invention will be more readily apparent from the following description when taken in connection with the accompanying drawings, in which.

DETAILED DESCRIPTION OF THE INVENTION

Figure 1:
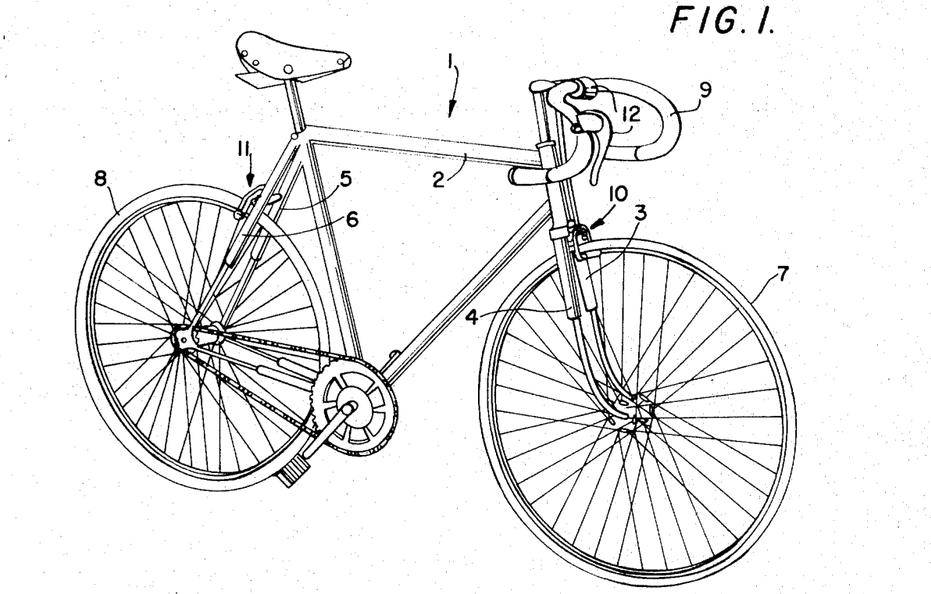
FIG. 1 is a side elevational view illustrating a bicycle having the braking arrangement of the invention applied thereto.

Referring now to the drawings, wherein like reference numerals indicate like parts throughout the several views, a bicycle is indicated generally at 1 in FIG. 1 and includes a frame 2 having spaced apart front wheel forks 3 and 4 and spaced apart rear frame forks 5 and 6. A front wheel 7 is rotatably supported by the front forks and a rear wheel 8 is rotatably supported by the rear forks. Drop type handlebars 9 are connected with the front forks for turning the front wheel 7 from side to side. A front brake assembly 10 is operatively associated with the front wheel and a rear brake assembly 11 is operatively associated with the rear wheel for applying a braking force to the front and rear wheels, respectively. A hand operated lever 12 is mounted to the handlebars and means interconnect the lever 12 and front and rear brake assemblies for actuating the brake when the lever is operated.

The brake assemblies 10 and 11 are hydraulically actuated and are independently connected in hydraulic circuits with the operating lever 12 on the handlebar.

Referring now to FIGS. 2 through 4 and FIG. 9, details of one form of the front brake assembly 10 are shown, wherein the brake assembly is assembled to the bicycle at the time of manufacture of the bicycle and is an integral part thereof. Th brake assembly 10 comprises a pair of finned hydraulic piston and cylinder units 13 and 14 mounted to the forks 3 and 4 in opposed relationship and on opposite sides of the rim of wheel 7. A piston rod 15, having a generally polygonal cross section, extends from one end of each cylinder and is recieved in a complementary opening 16 in the back of an elongate, finned brake tray or block 17 having an open end 18, a closed end 19 and one open side 20 defining a channel 21. A set screw S is provided for engaging rod 15 to lock it in the opening 16.

Figure 2:
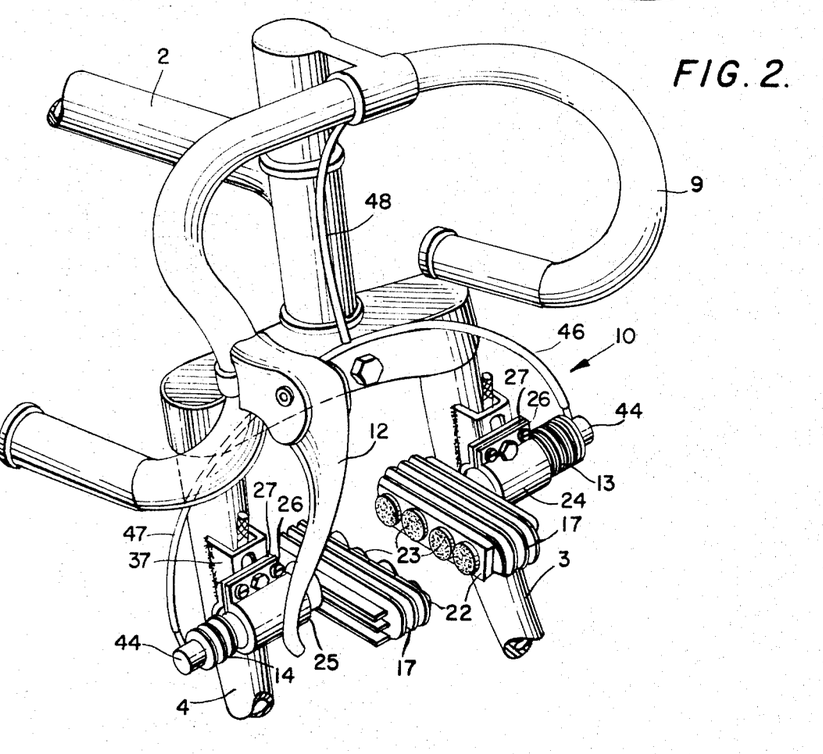
FIG. 2 is a fragmentary perspective view illustrating one form of brake block arrangement for a front wheel brake.
Figure 9:
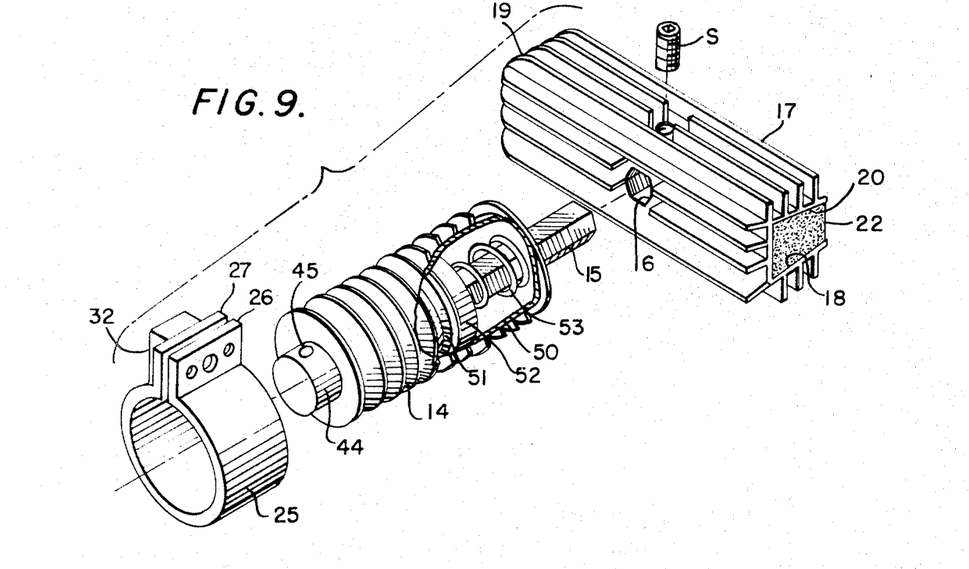
FIG. 9 is an exploded perspective view of the means and securing the brake block or shoe to the movable piston rod of the slave cylinder.

A relatively resilient brake shoe or pad 22 is suitably secured within the channel 21 as by bonding or the like and is preferably impregnated with aluminum fibers or the like to aid in the dissipation of heat into the housing 17 and the cooling fins on the housing. The brake pad 22 includes a plurality of circular disks or buttons 23 extending beyond the open side of the housing 17 for engagement with the rim of the wheel 7.

Figure 3:
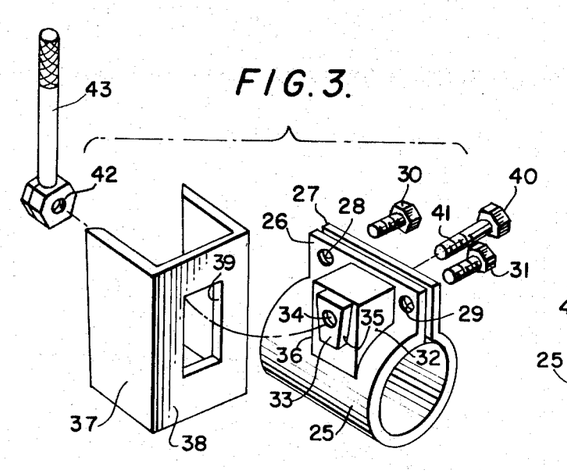
FIG. 3 is a perspective exploded view of the quick release bracket and clamping member for the piston and cylinder unit of an integral braking system.

The cylinders 13 and 14 are axially received through split clamping cylinders or sleeves 24 and 25, respectively. The cylinders 24 and 25 each include a pair of radially projecting, generally parallel clamping lips 26 and 27 having aligned openings 28 and 29 therethrough adjacent the opposite ends thereof for receiving suitable clamping means such as bolts 30 and 31 for drawing the sides of the split cylinders toward one another to securely clamp the brake cylinders 13 and 14 in adjusted axial position therein. The split cylinders 24 and 25 each has an enlarged boss 32 thereon extending from the cylinder up onto one of the clamping lips 26. The boss 32 has a wedge-shaped projection or detent 33 thereon with a central opening 25 therethrough. By way of specific example, the opposite sides 35 and 36 of the wedge-shaped protrusion 33 have a slope of approximately 30° with respect to the vertical. The split cylinders 24 and 25, and in turn, the piston and cylinder assemblies 13 and 14 and the brake shoe or block members 17 are releasably mounted to a generally channel shaped mounting bracket 37 which is welded or clamped or otherwise suitably secured to the forks of the bicycle.

Figure 4:
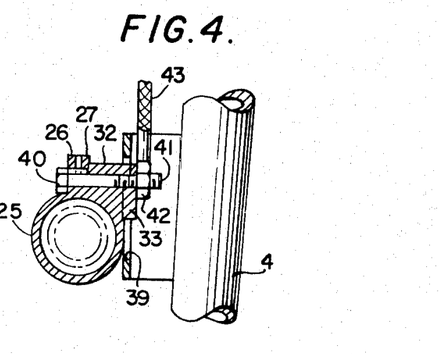
FIG. 4 is a vertical sectional view of the quick release mounting means of FIG. 3.

The mounting bracket 37 has an outer wall 38 extending in a plane substantially perpendicular to the plane of the wheel and an elongate, generally rectangularly shaped slot 39 is in the center of the wall 38. The width of slot 39 is approximately equal to the width of the wedge-shaped projection 33 at the widest point thereof. When assembled, the split-cylinder is positioned against the wall 38 of mounting bracket 37 with the wedge-shaped projection 33 received in the slot 39. A clamping bolt 40, having external threads 41 thereon, is received through aligned openings in the lips 26 and 27 and through the opening 34 in projection 33 and through the slot 39. A locking nut 42 having an elongated wing or handle 43 thereon is threaded onto the end of bolt 40 on the backside of wall 38 to securely clamp the split cylinder 34 to the mounting bracket 37.

Each brake cylinder 13 and 14 includes an axial projection 44 on the end thereof opposite the piston rod 15. An opening 45 is in one side of the projection 44 for attachment thereto of an hydraulic brake line. Brake lines 46 and 47 extend from the openings in the projections 44 on cylinders 13 and 14, respectively, to a T-fitting, which is connected via a single hydraulic brake line 48 to a master cylinder 49 on the handlebar 9.

Each brake cylinder 13 and 14 includes a finned, cylindrical housing 50 having an axially extensible bellows 51 therein secured at one end and in communication with opening 45. A piston 52 is carried by the other end of the bellows and the rod 15 is suitably connected to this piston. A coil compression spring 53 is engaged between the piston 52 and the end of housing 50 for returning the bellows, brake shoe and master cylinder to their normal rest positions when pressure is released from the lever 12. A compression spring inside the master cylinder (not shown) or a tension spring inside the slave cylinder (not shown) or any other spring arrangement could be used to return the parts to their normal, rest positions, if desired. The polygonally shaped rod 15 prevents the brake shoe from turning accidentally, and the convolutes of the bellows expand radially to relieve excess pressure, as for example when the brakes are applied under emergency or panic situations, to prevent damage to the system.

Figure 10:
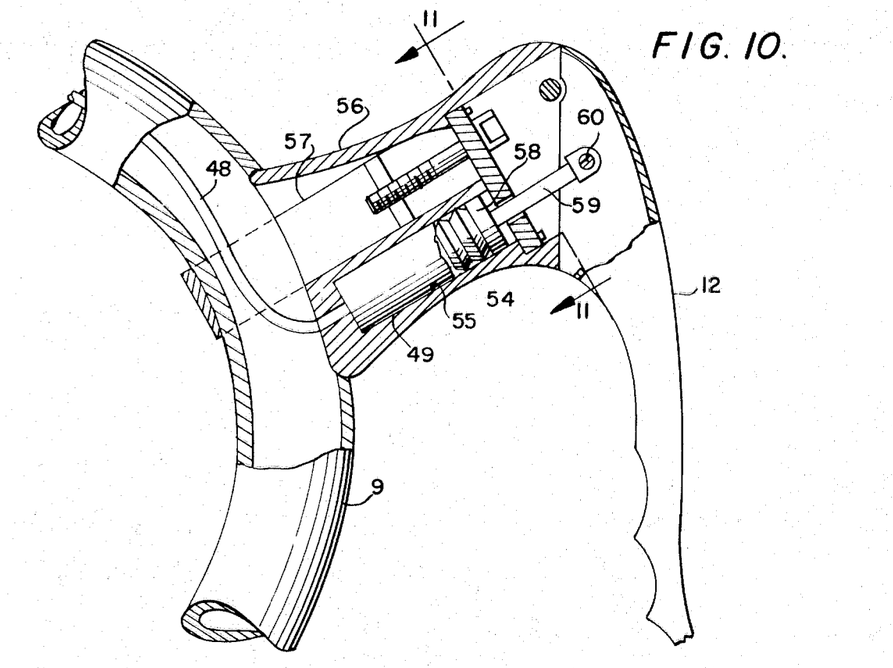
FIG. 10 is a fragmentary view, shown partly in section, of the hand manipulatable means and master cylinders of the brake.
Figures 11, 12:
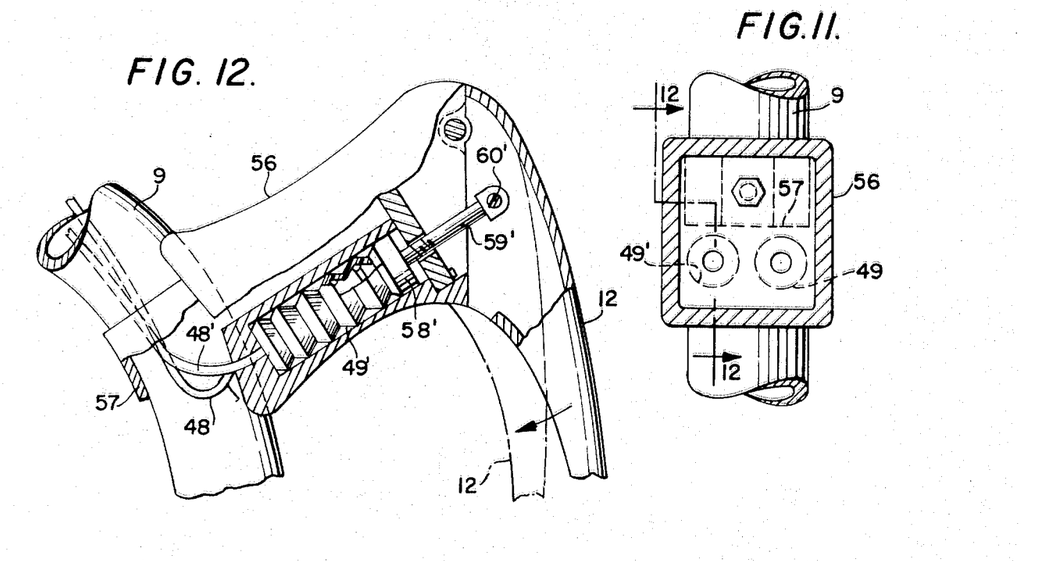
FIG. 11 is a sectional view taken along line 11-11 of FIG. 10 of the master cylinder arrangement.
FIG. 12 is a view similar to FIG. 10, further illustrating the master cylinder arrangement, and is taken along line 12—12 of FIG. 11.

The master cylinder 49 comprises an axially extensible bellows 54 in a bore 55 in a rectangular housing 56 suitably attached to the handlebar 9 as by a clamp 57. A piston 58 is on one end of the bellows 54 and an actuating rod 59 is connected at one end with the piston 58 and at the other end to a pivot 60 on lever 12 for reciprocating and collapsing the bellows to pressurize the system when the lever is depressed to the position shown in phantom lines in FIG. 12.

Figure 5:
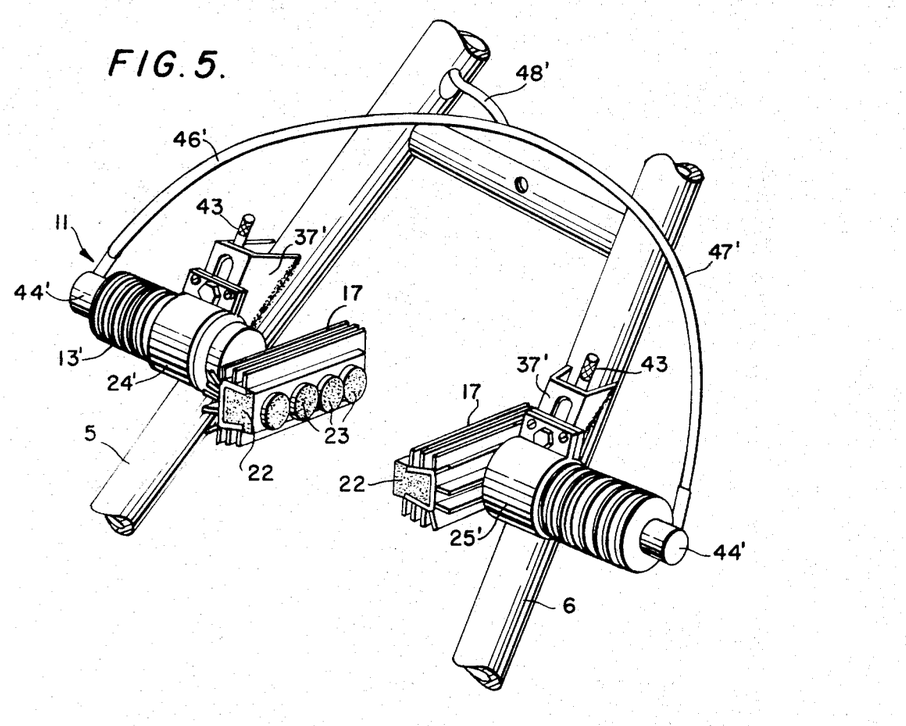
FIG. 5 is a fragmentary perspective view similar to FIG. 2 of the rear brake arrangement of an integral system.

The rear brake assembly 11 is shown in FIG. 5 and is identical in every respect with the front brake assembly 10, with corresponding parts having like reference numerals primed. The brake cylinders 13', 14' and the associated sleeves 24', 25' and brackets 37' are preferably mounted on the rear of forks 5 and 6, as shown, but they could be mounted on the front of the forks, if desired. With the assembly mounted on the rear of the forks, as shown, the assembly is subjected to less stress than if it is mounted on the front, since when the brake is applied, the drag force transmitted from the wheel to the brake is transferred or applied in compression directly to the forks.

The brake line 48' from the rear brakes is connected with a second master cylinder 49' for actuation by a hydraulic system independent of the front brake system when the lever is depressed, and accordingly in the event pressure is lost in one of the brake assemblies, the other brake assembly is still operative to stop or slow the bicycle.

Several adjustments of the brake assemblies are provided for accommodating and adjusting the brake assemblies to different size and design wheels and for adjusting the brake shoes or blocks to compensate for wear of the shoes. Initially, the brake cylinders 13 and 14 are loosely positioned or held in the sleeves 24 and 25, and the bolt 40 is extended through the lips 26 and 27 and the slot 39 in bracket 37 and the clamping nut 42 loosely positioned thereon. The cylinder and shoe brake assemblies are then properly vertically and axially adjusted with respect to the associated wheel rim by sliding the cylinders 13 and 14 axially in the sleeves 24 and 25 and by sliding the bolt 40 vertically in the slot 39. When the brake shoes are properly adjusted with respect to the rim, the bolts 30 and 31 are tightened to securely clamp the brake cylinders axially in the sleeves 24 and 25 and the nut 42 is turned on bolt 40 to securely clamp the sleeve and cylinder assembly veritcally in the slot 39 in bracket 37. Slight angular adjustment of the brake cylinder and shoe assemblies may be accomplished to accommodate tapered wheel rims, if desired, by tilting the cylinders 24 and 25 and the wedge-shaped projections 33 in the slots 39 prior to tightening the nut 42. With the adjustments provided as described above, the front or rear brake assemblies may be adjusted to engage the wheel rim prior to the other brake assembly engaging the wheel rim, if desired. Moreover, the hydraulic system ensures that each of the brake shoes will engage the wheel rim simultaneously upon application of pressure to the brake cylinders even though the wheel rim is out of alignment or warped or the like since the hydraulic fluid will immediately go through the lines 46 and 47 to the cylinders when the lever 12 is depressed.

When it is desired or necessary to remove a wheel, the quick release nut 42 is turned by turning the wing or handle 43 to release the clamping pressure of bolt 40 on lips 26 and 27 against wall 38 of bracket 37 to permit pivotal or swinging movement of the brake assembly downwardly and outwardly away from the wheel rim so that the wheel may be withdrawn therebetween. This quick release feature is important in racing applications, wherein speed is of the utmost importance, and with conventional systems an excessive amount of time is required in order to manipulate the complicated conventional clamping means to move the brake assemblies out of the way of the wheel.

Upon release of the pressure on lever 12, the coil spring 53 in the wheel cylinders 13 and 14 returns the hydraulic system to its normal rest position. further, when the brake shoes 22 become excessively worn, they are easily replaced simply by loosening the set screw S and removing the worn brake shoe assembly from the piston rod 15 and replacing it with a new one.

The brake line extending from the master cylinders to the wheel cylinders in this braking system extend through and within the frame of the bicycle and, accordingly, presents an uncluttered appearance and is not subjected to the danger or possibility of damage or interference with operation of the bicycle. Moreover, the brake line which is confined within the frame of the bicycle may be rigid or flexible, as desired; and if it is rigid, the exposed portion of the brake line 46 and 47 which extends from the brake line confined within the frame to the wheel cylinders is preferably flexible to permit unrestricted manipulation and movement of the wheel cylinders.

Figure 6:
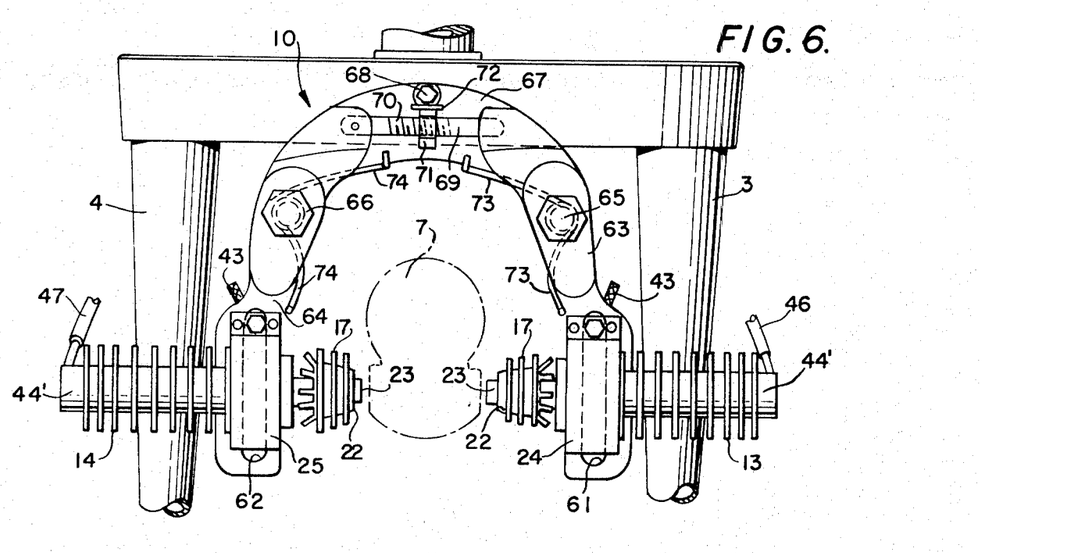
FIG. 6 is a front view illustrating the front wheel brake mounting of the form of the invention wherein the braking system comprises an attachment for existing bicycles.
Figure 7:
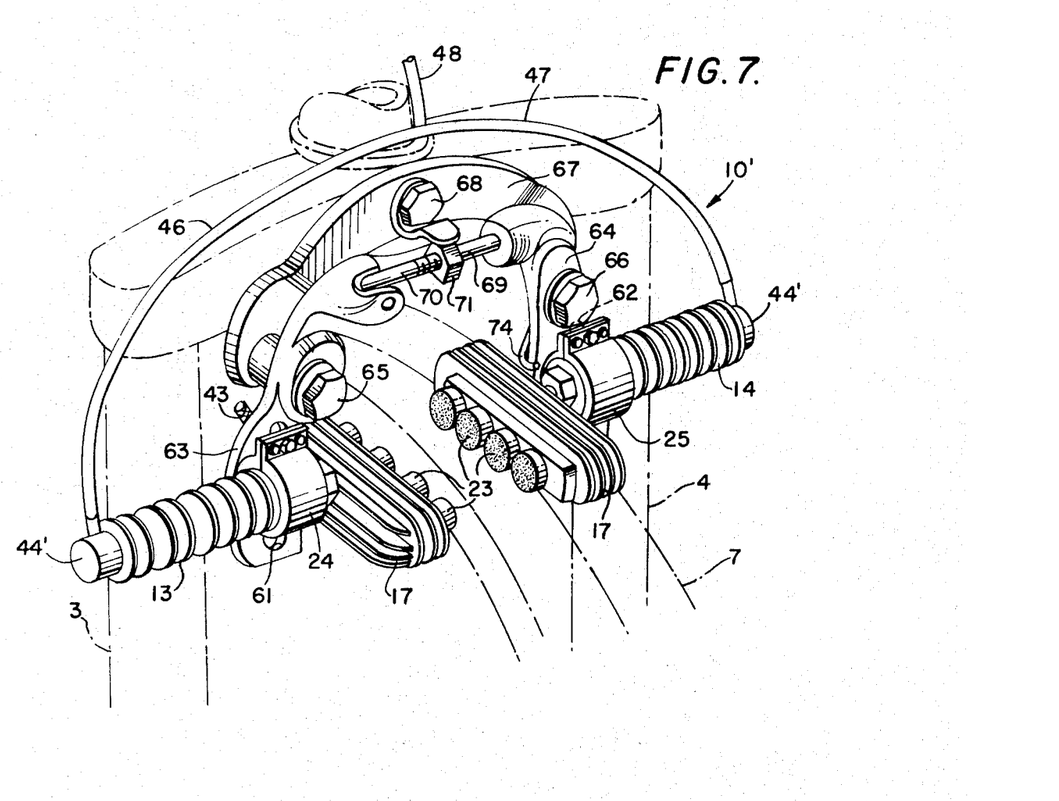
FIG. 7 is a perspective view illustrating details of a brake shoe attachment unit that permits axial adjustment and swinging movement thereof relative to a wheel rim with the attachment brake shown associated with the front forks of a bicycle.
Figure 8:
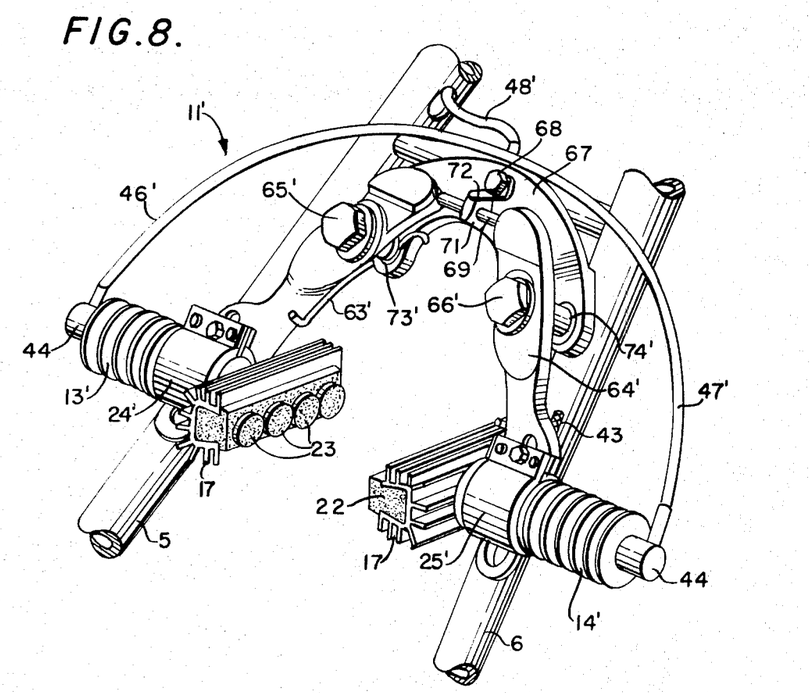
FIG. 8 is a perspective view similar to FIG. 7 of the attachment brake shown on the rear forks of a bicycle.

Referring now to FIGS. 6, 7 and 8, a modification of the invention illustrated in FIGS. 1 through 5 is shown. In this form of the invention, the brake assembly comprises an attachment for existing bicycles or a replacement for existing brake systems on bicycles. The wheel cylinder assemblies 13', 14', the brake blocks 17, brake shoes 22 and split sleeves 24', 25' are identical in construction and operation to the form of the invention illustrated in FIGS. 1 through 5. However, rather than the split sleeves 24', 25' being adjustably clamped to a pair of brackets 37 welded or otherwise suitably fixed to the frame as in the first form of the invention, the split sleeves 24', 25' and associated wheel cylinder assemblies 13', 14' are adjustably clamped in a pair of vertical slots 61, 62 in the lower end of a pair of lever arms 63 and 64 pivotally mounted intermediate the ends thereof about bolts 65 and 66 attached to the opposite ends of a crescent or arcuately shaped mounting plate or bracket 67 fixed to the frame of the bicycle as by means of a bolt 68 or the like extended through the mid-portion of the bracket 67 into the frame of the bicycle.

A two-piece micrometer adjusting bolt 69 is engaged between the adjacent upper ends of the lever arms 63 and 64 and includes a threaded portion 70 and a nut 71. A detent plate 72 is held to the bracket 67 by bolt 68 and extends in overlying relationship to nut 71 to prevent the nut from turning accidentally.

A pair of leaf spring members 73 and 74 are looped around the bolts 65 and 66 intermediate their ends with one end thereof engaged with the inside edge of the lever arms adjacent their lower ends and the other end thereof engaged against the inside edge of the mounting bracket 67 at the opposite ends thereof for urging the lower ends of the lever arms outwardly about the pivot bolts 65 and 66 and for maintaining the upper ends of the lever arms in engagement with the opposite ends of the micrometer adjusting bolt 69.

In addition to the vertical, axial and angular adjustments of the wheel cylinders and brake shoes relative to the split sleeves and slots 61 and 62, which is accomplished in the same manner as in the previous form of the invention, the micrometer adjusting bolt 69 and nut 71 permits fine adjustment of the brake shoe relative to the rim of the wheel simply by turning the nut in the appropriate direction to either lengthen or shorten the bolt 69 and thus move the lower ends of the arms 63 and 64 and the associated brake shoes toward or away from the wheel rim, as desired.

When it is necessary or desirable to remove a wheel from the bicycle, the lower ends of the lever arms are simply squeezed or forced toward one another, thereby moving the upper ends of the lever arms away from one another and permitting the micrometer adjusting bolt 69 to swing or drop free at one end from the corresponding end of the lever arm; and, consequently, upon release of pressure on the lower ends of the lever arms, they swing outwardly about the pivot bolts 65 and 66 to provide clearance for removal of the wheel between the brake shoes.

The modified front brake assembly 10' is shown mounted to the front of the forks 3 and 4 in FIG. 6 and to the rear of the forks 3 and 4 in FIG. 7. The assembly can be equally as well mounted either way, but when it is mounted to the rear of the forks as in FIG. 7, the drag force transmitted from the wheel to the brake shoes and lever arms 63 and 64 is applied through the pivot bolts 65 and 66 to the bracket 67 and against the frame thereby putting less stress on the assembly than if the assembly is mounted to the front of the forks as in FIG. 6, wherein the force would be transferred through the lever arms to the bracket and applied to the bolt 68.

The modified rear brake assembly 11' is shown in FIG. 8 and is identical in construction and operation with the modified front brake assembly 10', with corresponding parts indicated by like reference numerals primed. As in the previous modification, the front and rear brake assemblies are independently operated with independent hydraulic lines going to a pair of independent master cylinders in the housing 56 on the handlebar, the master cylinders being operated together when the lever 12 is depressed.

A third form of the invention is shown in FIGS. 13 through 16 and comprises a generally horseshoe shaped bracket 75 secured to the frame of the bicycle or the like by means of a bolt 68 extended through the upper arcuate end portion of bracket 75. The lower ends 76 and 77 of the horseshoe shaped bracket 75 are slightly enlarged and each has a vertical elongate slot 78 therein. A pair of clamping attachments 79 and 80 are adjustably held to the bracket 75 in the slots 78 by means of a bolt or the like 81 extended through the slots and into one end of the clamping attachments 79 and 80. By loosening the bolts 81, the clamping attachments 79 and 80 may be vertically adjusted in the slot 78 for accommodating the brake shoes or blocks 17 relative to the rim of wheel 8. Also, the attachments 79 and 80 may be pivotally adjusted about their longitudinal axes when the bolts are loosened to provide an angular adjustment of the brake shoes or blocks 17 relative to the rim of the wheel.

The brake shoes or blocks 17 are each carried on a piston rod 15 having a polygonal cross section as seen in FIG. 9, and the piston rod extends into a slave cylinder 82 and 83 at the opposite sides of the bracket, respectively. The slave cylinders 82 and 83 are received through bores 84 and 85 in the attachments 79 and 80, respectively, and each is secured in its respective bore by means of a set screw or the like 86 and 87 by means of which the slave cylinders 82 and 83 may be axially adjusted relative to the clamping attachments 79 and 80 for adjusting the brake shoes or blocks 17 relative to the rim of wheel 8.

As can be seen, this form of the invention is simpler and more rugged in construction than the forms of the invention illustrated in FIGS. 5 and 6.

Figure 13:
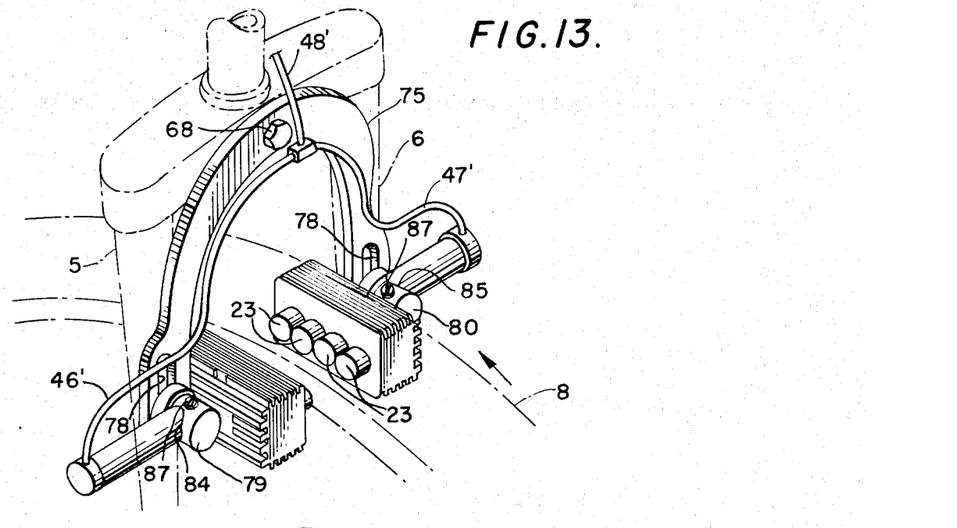
FIG. 13 is a perspective view of a third form of bicycle brake arrangement with the brake arrangement applied to the rear side of the forks of a bicycle.
Figure 14:
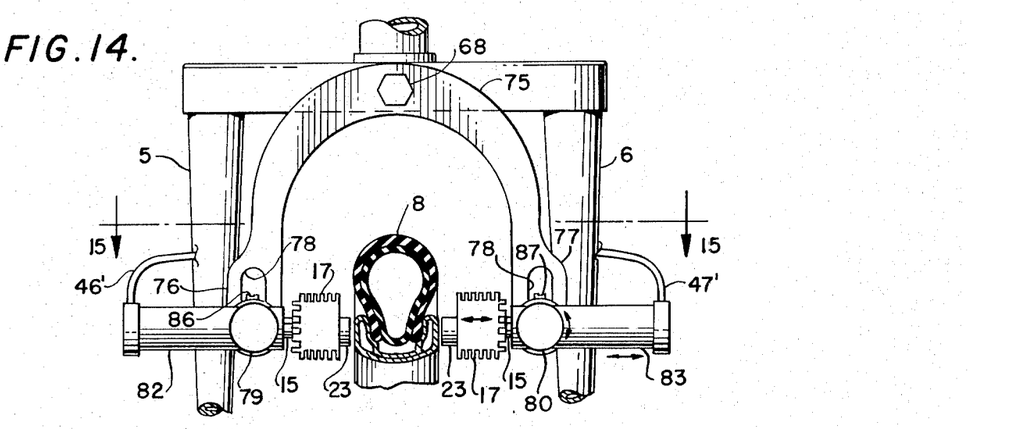
FIG. 14 is a view in elevation, shown partly in section, of the bicycle brake arrangement of FIG. 13.
Figure 15:
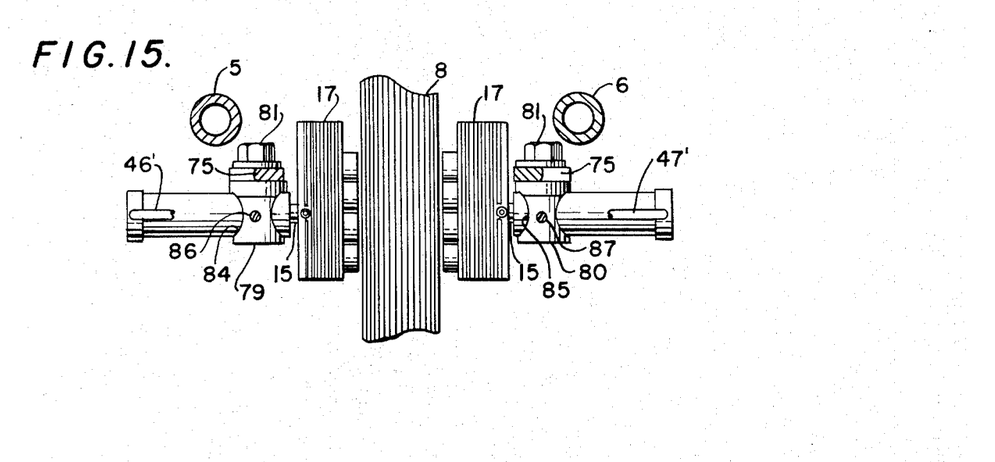
FIG. 15 is a view in section taken along line 15—15 in FIG. 14.

As in the previous forms of the invention, by loosening the nuts 81, the slave cylinders and brake block units 17 can be swung about an axis parallel to the longitudinal axis of the bicycle to facilitate removal of the wheel 8.

Although the hydraulic actuating means has been described and illustrated herein as a piston-bellows unit, it could equally as well comprise a piston or other suitable means as desired.

Accordingly, by means of the present invention, several quick and easy adjustments of the brake assemblies are provided, and a person need not be highly skilled in order to make fine adjustments to the brake assembly of the present invention.

Thus, this invention provides a bicycle brake arrangement in which pairs of opposed front and rear wheel rim engaging brake block units are mounted on the forks of the bicycle. Each brake unit includes a brake wheel cylinder or slave hydraulic cylinder having a slave piston therein which is normally retracted by a suitable spring means. The piston rod is connected to a brake block member by a connection which enables easy replacement of the shoe or block units and the mounting means for the wheel brake assemblies releasably permits swinging of the brake block members apart to facilitate wheel changing. The slave cylinder of each brake block unit is supported in a sleeve having means disposed through a slot in a support means and adjustably clamped thereto. With this mounting, each brake block unit can be raised or lowered or pivotally adjusted. Further, the sleeve may be loosened about the slave cylinder so that the brake block units may also be moved axially toward or away from the wheel rim. This permits accurate positioning of the units, and one unit associated with one wheel may be independently adjusted with the brake blocks thereof closer to the rim than those associated with the other wheel. Thus, for example, the rear wheel brake can start to be applied prior to the front wheel brake.

Further, each piston or bellows in the wheel cylinder is connected to a brake shoe accommodating tray or housing and in some forms of the invention both the slave cylinder and the tray or housing are provided with external heat dissipating fins.

As stated, fluid lines for the system of the invention can be fed through the frame and forks and include flexible portions from the handlebar to the front brake tee block and into the main longitudinal frame member. This arrangement is contemplated when the system is part of original equipment. In such instances, the support brackets would be welded onto the front and rear forks, and the lines within the frame could be flexible or of steel or the like, as desired.

If the system is sold separately in kit form to replace existing brakes, the hydraulic cylinder-piston units and associated flexible piping would be sealed systems, the housing or base for the master cylinders and hand operable lever and the supports for the brake block actuating units would be of the clamp-on type. The kit would contain suitable clamps to clamp the hydraulic lines to the handlebar, main frame and forks.

If the master cylinder, slave cylinder and associated fluid lines are of the pre-sealed type, such as a sealed system bellows unit, the unit is vacuum filled and sealed at the factory and requires no bleeding or filling by the user in order to be operative. This insures a closed, air tight system.

While the invention has been described with reference to a bicycle, it could equally as well be applied to a motorcycle or the like, if desired.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A bicycle brake arrangement for a bicycle having front and rear wheel accommodating forks and front and rear wheels supported by the forks, comprising a master cylinder means carried by the bicycle, a pair of separate, aligned brake block units carried by the bicycle on opposite sides of the rim of each wheel, said units each including slave cylinder means and axially movable brake blocks carried by the slave cylinder means, conduit means connected to the master cylinder means and to each of the slave cylinder means to convey pressurized fluid from the master cylinder means to the slave cylinder means, said axially movable brake blocks movable toward and away from the opposite sides of the rims of the wheels in respective rim engaging and rim disengaging relationship upon actuation of the master cylinder means and slave cylinder means.

2. A bicycle brake arrangement as claimed in claim 1, wherein is included mounting means connected to the bicycle and to the brake block units supporting the brake block units on their respective opposite sides of a respective front and rear wheel.

3. A bicycle brake arrangement as claimed in claim 1, wherein said master cylinder means includes a pair of master cylinders, each having a normally extended piston therein, a pair of fluid conveying conduits indpendently interconnecting one master cylinder with the pair of slave cylinders associated with the front wheel and the other master cylinder with the pair of slave cylinders associated with the rear wheel, said fluid conveying conduits each including a tee coupling and a conduit section extending from the tee coupling to each of the slave cylinders on respective opposite sides of the front and rear wheels.

4. A bicycle brake arrangement as claimed in claim 3, wherein is included means mounting said master cylinders in side-by-side relationship on a handlebar of said bicycle, and only one movable hand manipulatable control lever operatively connected with said master cylinders to substantially simultaneously pressurize the fluid in the master cylinders to thus operate the slave cylinders and brake blocks.

5. A bicycle brake arrangement for a bicycle having front and rear wheel accommodating forks and front and rear wheels supported by the forks, comprising a factory sealed fluid pressurizable system, including a master cylinder means, separate aligned wheel associated brake block units, including slave cylinder means for each of the front and rear wheels, and a brake block carried by each slave cylinder means, and conduit means connected between the master cylinder means and the slave cylinder means, said master cylinder means, said slave cylinder means and said conduit means all assembled together, filled with fluid and sealed prior to attachment thereof as a unit to a bicycle, and brake block means on opposite sides of each of the front and rear wheels and operably connected to the slave cylinder means so as to be actuatable by the slave cylinder means into and out of rim engaging relationship upon actuation of the master cylinder means, said factory sealed system eliminating the necessity of filling the system at the time of attachment of the brake arrangement to a bicycle and preventing loss of fluid from the system or contamination of the fluid in the system.

6. A bicycle brake arrangement as claimed in claim 2, wherein the mounting means for said brake block units includes components on said forks supporting said units with their axes at least generally perpendicular to the planes of the adjacent wheel rims.

7. A bicycle brake arrangement as claimed in claim 6, in which said brake block units are axially adjustable in said mounting means.

8. A bicycle brake arrangement as claimed in claim 6, in which said brake block units are vertically adjustable in said mounting means.

9. A bicycle brake arrangement as claimed in claim 6, in which said brake block units are both axially and vertically adjustable in said mounting means.

10. A bicycle brake arrangement as claimed in claim 2, in which said mounting means for each of said brake block units include, mounting brackets carried by the respective forks, each mounting bracket extending generally parallel to the plane of the wheel and having a generally vertically extending slot therein, each slave cylinder means carried in a split sleeve, bolt means associated with each said split sleeve for clamping said sleeve on said slave cylinder in different adjusted positions, said bolt means disposed through said slot, internally threaded nut means in threaded engagement with said bolt means associated with each slave cylinder means for adjustably clamping the slave cylinder to the mounting bracket so that their axes are at least generally perpendicular to the plane of the adjacent wheel rim so that said slave cylinders can be axially and vertically adjusted relative to a wheel rim to permit the brake blocks associated with one wheel to engage the rim thereof before the brake blocks associated with the other wheel engage the rim thereof.

11. A bicycle arrangement as claimed in claim 10, wherein each slave cylinder means includes an extension on one end thereof, each said extension having a hole in the side thereof, and a hydraulic line connected with said hole.

12. A bicycle brake arrangement as claimed in claim 6, and wherein said split sleeve, mounting bracket and bolt means include means for releaseably permitting said brake blocks to swing out of line about axes parallel to the longitudinal axis of the bicycle so as to facilitate wheel removal.

13. A bicycle brake arrangement as claimed in claim 1, including mounting means releasably mounting each said slave cylinder and its associated brake block for at least upward swinging movement relative to its support about an axis parallel to the longitudinal axis of the bicycle to facilitate wheel removal.

14. A bicycle brake arrangement as claimed in claim 5, and means for axially and vertically adjusting the position of each brake block unit.

15. A bicycle brake arrangement as claimed in claim 1, wherein said slave cylinder means each includes a normally retracted piston means, a brake shoe housing means carried by each piston means, said housing means including an open end facing away from the forward direction of bicycle movement, and a brake shoe carried by each housing means.

16. A bicycle brake arrangement as claimed in claim 15 wherein each slave cylinder and each housing has external heat dissipating fins thereon.

17. A bicycle brake arrangement as claimed in claim 15, wherein each mounting means includes a movable mounting arm carried by the bicycle forks on opposite sides of the associated wheel, each arm having a vertical slot therein, each slave cylinder means axially adjustably mounted in a split sleeve means, and externally threaded means on said split sleeve means disposed through said slot in an associated arm, and an internally threaded nut means in threaded engagement with the externally threaded means on each split sleeve to adjustably clamp each slave cylinder and piston means to each arm.

18. A bicycle brake arrangement as claimed in claim 17, wherein each mounting arm is pivotally mounted intermediate its ends to the frame of the bicycle, the lower ends of the arms having said slots therein and normally biased apart by spring means engaged with the mounting arms.

19. A bicycle brake arrangement as claimed in claim 18, wherein the upper ends of the arms are held in spaced apart relationship against the action of said spring means by a micrometer adjusting bolt engaged between the upper ends of the arms.

20. A bicycle brake arrangement as claimed in claim 19, wherein the mounting arms are mounted by means of pivot bolts to the opposite ends of a crescent shaped mounting plate fixed to the frame of the bicycle.

21. A bicycle brake arrangement as claimed in claim 20, wherein said micrometer adjusting bolt includes a nut threadably mounted thereon for adjusting the length of the bolt to adjust the distance between the adjacent ends of the mounting arms, and detent plate means carried by the mounting bracket and engaged with the nut for preventing accidental turning thereof.

22. A bicycle brake arrangement as in claim 16, wherein each slave cylinder is carried by a clamping attachment adjustably secured to the lower ends of a horseshoe shaped bracket, said bracket being connected to the frame of the bicycle with the opposite ends thereof positioned on opposite sides of the rim of the wheel of the bicycle.

23. A bicycle brake arrangement as in claim 22, wherein said horseshoe shaped bracekt is of one piece construction and has an elongated vertically extending slot in the lower ends of the bracket, said clamping attachment means each having a portion extending through the slots and adjustably clamped thereto by means of a nut or the like.

24. A bicycle brake arrangement as claimed in claim 23, wherein each slave cylinder means is axially adjustably positioned in said clamping attachment means, said clamping attachment means each having a bore extended therethrough in a direction parallel to the axis of rotation of the wheel of the bicycle with said slave cylinder means received through said bores, and a set screw associated with said clamping attachment means and said slave cylinder means for clamping said slave cylinder means in axially adjusted position in said clamping attachment means.

25. A bicycle brake arrangement as in claim 5, wherein the fluid pressurizable system includes bellows type master cylinders and bellows type slave cylinders.

26. A bicycle brake arrangement as in claim 25, wherein the fluid pressurizable system is vacuum filled and sealed at the factory to insure a closed, air-tight system requiring no bleeding or filling by the user of the brake arrangement.

* * * * *